US011775317B2

(12) United States Patent
Chen et al.

(10) Patent No.: US 11,775,317 B2
(45) Date of Patent: Oct. 3, 2023

(54) LOCATE NEURAL NETWORK PERFORMANCE HOT SPOTS

(71) Applicant: International Business Machines Corporation, Armonk, NY (US)

(72) Inventors: Qin Yue Chen, Shanghai (CN); Li Cao, Bei Jing (CN); Fei Fei Li, Huang Pu (CN); Han Su, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 17/245,042

(22) Filed: Apr. 30, 2021

(65) Prior Publication Data

US 2022/0350619 A1 Nov. 3, 2022

(51) Int. Cl.
G06F 9/445 (2018.01)
G06F 11/34 (2006.01)
G06F 8/41 (2018.01)
G06N 3/063 (2023.01)

(52) U.S. Cl.
CPC .......... *G06F 9/44505* (2013.01); *G06F 8/443* (2013.01); *G06F 8/445* (2013.01); *G06F 11/3428* (2013.01); *G06N 3/063* (2013.01); *G06F 2201/81* (2013.01)

(58) Field of Classification Search
CPC ................................................... G06F 8/4441
See application file for complete search history.

(56) References Cited

U.S. PATENT DOCUMENTS

| 6,681,387 B1 * | 1/2004 | Hwu ..................... G06F 8/4441 |
| | | 714/38.12 |
| 10,209,764 B2 * | 2/2019 | Levit-Gurevich .... G06F 1/3206 |
| 10,515,306 B1 * | 12/2019 | David .................... G06N 3/084 |
| 11,055,617 B1 * | 7/2021 | David .................... G06N 5/046 |

(Continued)

FOREIGN PATENT DOCUMENTS

| CN | 109857459 A | 6/2019 |
| CN | 110308909 A | 8/2019 |

(Continued)

OTHER PUBLICATIONS

Zekany, Stephen, et al. "CrystalBall: Statically analyzing runtime behavior via deep sequence learning." 2016 49th Annual IEEE/ACM International Symposium on Microarchitecture (MICRO). IEEE, 2016. (Year: 2016).*

(Continued)

*Primary Examiner* — Matthew J Brophy
(74) *Attorney, Agent, or Firm* — Caleb Wilkes; Cantor Colburn LLP

(57) ABSTRACT

Embodiments for locating performance hot spots include collecting sample data having instruction addresses, the sample data being for a neural network model and determining instructions in the instruction addresses that are performance hot spots. A listing file is used to map the instructions of the sample data that are performance hot spots to locations in a lower-level intermediate representation. A mapping file is used to map the locations of the lower-level intermediate representation that are performance hot spots to operations in one or more higher-level representations, one or more of the operations corresponding to the performance hot spots, the mapping file being generated from compiling the neural network model.

20 Claims, 10 Drawing Sheets

(56) References Cited

U.S. PATENT DOCUMENTS

| | | | |
|---|---|---|---|
| 11,645,533 B2* | 5/2023 | Xie | G06F 30/27 |
| | | | 706/21 |
| 2011/0016460 A1 | 1/2011 | Archambault et al. | |
| 2013/0031536 A1 | 9/2013 | De et al. | |
| 2017/0090891 A1* | 3/2017 | Guerre | G06F 8/71 |
| 2018/0173291 A1* | 6/2018 | Levit-Gurevich | G06F 1/3206 |
| 2019/0042395 A1* | 2/2019 | Tian | G06F 11/3612 |
| 2019/0286972 A1* | 9/2019 | El Husseini | G06N 3/063 |
| 2019/0392296 A1* | 12/2019 | Brady | G06N 3/063 |
| 2020/0327417 A1* | 10/2020 | Xie | G06F 30/367 |
| 2021/0406692 A1* | 12/2021 | David | G06V 10/82 |
| 2022/0012579 A1* | 1/2022 | Asama | G06N 3/045 |
| 2022/0012593 A1* | 1/2022 | Huang | G06N 3/045 |
| 2022/0067481 A1* | 3/2022 | Chhabria | G06N 3/04 |
| 2022/0303176 A1* | 9/2022 | Pandey | G06N 3/0464 |
| 2022/0350619 A1* | 11/2022 | Chen | G06N 3/063 |

FOREIGN PATENT DOCUMENTS

| | | | |
|---|---|---|---|
| CN | 111666071 A | 9/2020 | |
| CN | 112465108 A | 3/2021 | |
| CN | 112529175 A | 3/2021 | |

OTHER PUBLICATIONS

Jin; "Compiling ONNX Neural Network Models Using MLIR"; arXiv.org; Aug. 2020. 8 pages.
International Search Report; International Application No. PCT CN2022/079778; International Filing Date: Mar. 8, 2022; dated Jun. 7, 2022; 9 pages.

* cited by examiner

LOCATE NEURAL NETWORK PERFORMANCE HOT SPOTS

BACKGROUND

The present invention generally relates to computer systems, and more specifically, to computer-implemented methods, computer systems, and computer program products configured and arranged for locating neural network performance hot spot.

Artificial neural networks, usually called neural networks, are computing systems inspired by the biological neural networks that constitute animal brains. An artificial neural network is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), through one or more hidden layers, to the last layer (the output layer), possibly after traversing the layers multiple times.

A neural network can be very complex composed of numerous instructions that are compiled. Sometimes, there can be a performance hot spot for one or more instructions. A performance hot spot in computer science is most usually defined as a region of a computer program where a high proportion of executed instructions occur and/or where the most time is spent during the program's execution. If a program is interrupted randomly, the program counter (the pointer to the next instruction to be executed) is frequently found to contain the address of an instruction within a certain range, possibly indicating code that needs optimization. However, it may be difficult to determine and/or locate a performance hot spot in need of optimization in neural network models, especially those compiled with modern compilers, and thus improvements are needed.

SUMMARY

Embodiments of the present invention are directed to computer-implemented methods for locating neural network performance hot spots for optimization. A non-limiting example computer-implemented method includes collecting sample data having instruction addresses, the memory sample data being for a neural network model. The method includes determining instructions in the instruction addresses that are performance hot spots and using a listing file to map the instructions of the sample data that are performance hot spots to locations in a lower-level intermediate representation. Also, the method includes using mapping files to map the locations of the lower-level intermediate representation that are performance hot spots to operations in one or more higher-level representations, one or more of the operations corresponding to the performance hot spots, the mapping file being generated from compiling the neural network model.

This can provide an improvement over known methods for performance hot spots by efficiently determining and locating performance hot spots at higher-level intermediate representations related to neural network models. The higher-level representations are easier to read, understand, and modify by a human user, such that optimizations can be made to performance hot spots affecting the neural network model, thereby improving the execution of the neural network model. Furthermore, improvements in one or more embodiments can be utilized to locate performance hot spots in any suitable level. One or more embodiments can find the biggest hot spot such that a minimum effort can be utilized to optimize hot spot performance.

In addition to one or more of the features described above or below, or as an alternative, in further embodiments of the invention the method may include using the mapping file to map the operations in the one or more higher-level representations to nodes in the neural network model. Thus, improvements advantageously identify which nodes in the neural network model are performance hot spots.

In addition to one or more of the features described above or below, or as an alternative, in further embodiments of the invention the method may include determining which nodes in the neural network model represent the performance hot spots based on mapping from the one or more higher-level representations which were mapped from the lower-level intermediate representation which was mapped from the sample data. Thus, improvements advantageously trace performance hot spots from a more difficult machine-readable code, such as binary code, to operations at a level which are easier to read, understand, and modify by a human user. Although compilation is a top down process, one or more embodiments provide a bottom up mapping process which uses the mapping file to map relationships up from lower levels.

In addition to one or more of the features described above or below, or as an alternative, in further embodiments of the invention the method may include using the mapping file to categorize the performance hot spots in different levels of compiling the neural network model, the different levels including the lower-level intermediate representation through the one or more higher-level representations. Thus, improvements advantageously provide options at different levels for optimizing performance hot spots in the neural network model.

In addition to one or more of the features described above or below, or as an alternative, in further embodiments of the invention the sample data further includes information from one or more counters.

In addition to one or more of the features described above or below, or as an alternative, in further embodiments of the invention the performance hot spots include one or more metrics that meet or exceed one or more thresholds.

In addition to one or more of the features described above or below, or as an alternative, in further embodiments of the invention the method includes determining one or more of the operations in the one or more higher-level representations to optimize to thereby address the performance hot spots.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
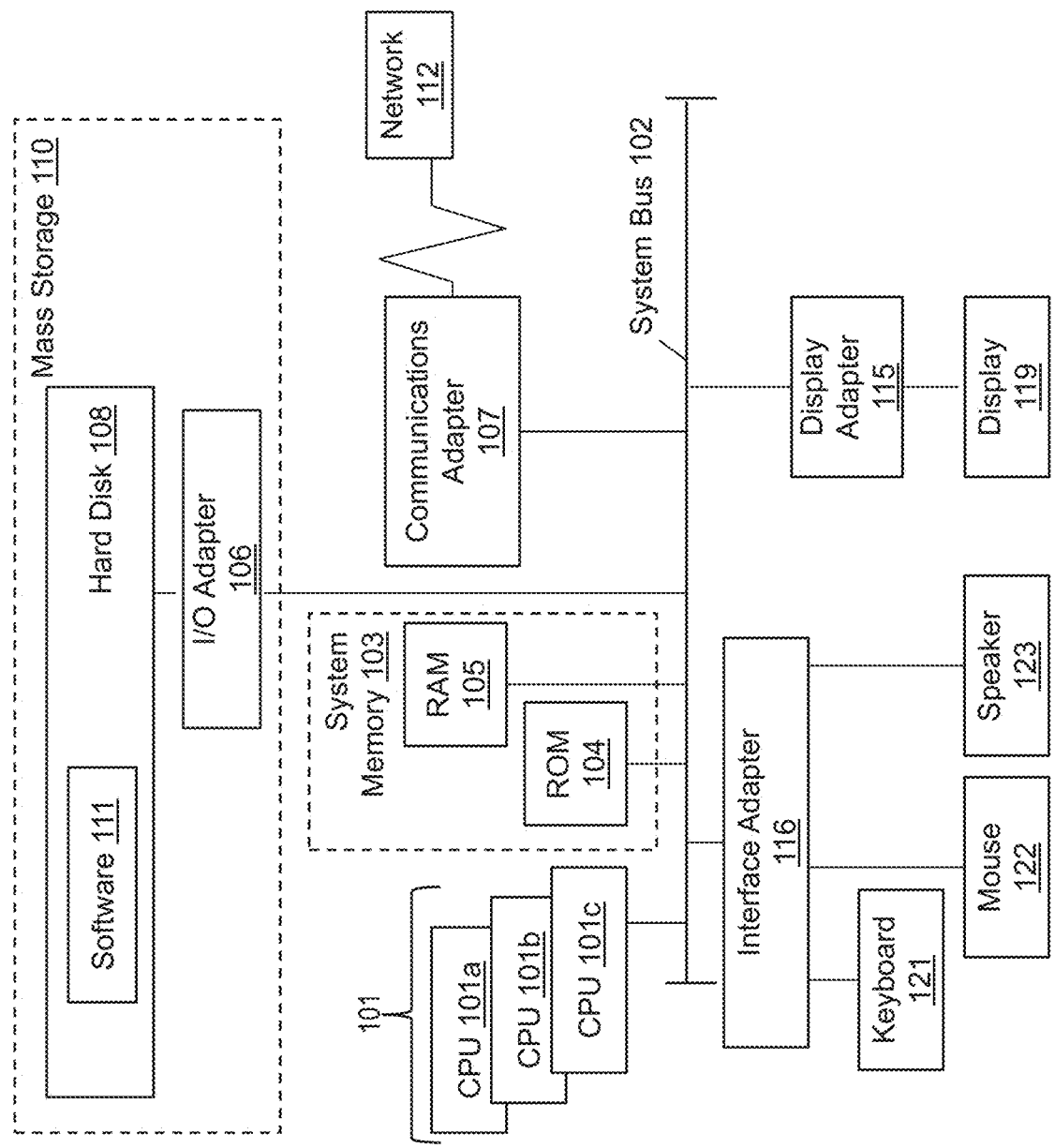
FIG. 1 depicts a block diagram of an example computer system for use in conjunction with one or more embodiments of the present invention.

One or more embodiments of the present invention provide computer-implemented methods, computer systems, and computer program products arranged and configured for locating and optimizing neural network performance hot spots. One or more embodiments are configured to use multi-level intermediate representation (MLIR) instruction address (IA) mapping files for a neural network model to solve the problem of locating performance hot spots in neural network nodes, including locating performance hot spots at different compilation levels, in order to optimize neural network performance. According to one or more embodiments, MLIR IA mapping files are utilized to map instruction address samples to name/location elements in the MLIR compilation which can include MLIR dialects operations and MLIR passes as well as neural network nodes. The MLIR IA mapping files and MLIR dialects are utilized to annotate a data flow graph and MLIR elements with performance hot index information. Furthermore, one or more embodiments are searching for and finding the hottest neural network operations, hottest operations in each compiler level, and also the hottest performance instructions ranges.

There are overarching practical questions in performance analysis, such as, for example, which parts of the program take the most execution time indicative of an actual performance issue to be fixed and how can one fix the performance issue. The code regions which take the most execution time, also referred to as central processing unit (CPU) time, are called performance hot spots. Performance hot spots can also be referred to as portions of code requiring the most CPU usage, for example, CPU percentage for instructions over a given period of time as compared to other portions of code. The performance hot spots are the best places to tune and optimize because a little effort in making a performance hot spot faster can have a large performance improvement in the neural network mode. It can be difficult to find a performance hot spot in a neural network model. A single module without function level symbols can be in a neural network module, and there can be hot instructions (i.e., causing the performance hot spot) distributed in ten thousand instructions or more. Even if it were possible to find the hottest basic block patterns, it would be difficult to know which part to optimize.

As technical solutions and advantages to improve the determining and location of performance hot spots for neural network models, one or more embodiments are configured to locate which neural network nodes in the graph are the performance hot spots and/or which operations in MLIR are performance hots pots, thereby locating neural network performance hot spots. One or more embodiments provide the opportunity to optimize (i.e., improve) performance hot spots at different levels including different levels of compiling the neural network model, such as MLIP compiling levels. It should be appreciated that performance hot spot, hot spot, hot spot information, hot index information, hot, etc., can be utilized interchangeably to refer to one or more instructions and/or operations utilizing more execution time (i.e., CPU time) and/or requiring more CPU usage/percentage compared to other instructions/operations and/or compared to a predetermined threshold. By determining performance hot spots in one of the lower-level and/or higher level intermediate representations, optimizations can be made at any level to improve execution of the neural network model, thereby improving the functioning of the computer system (itself) executing the neural network model. Determining performance hot spots to optimize for a neural network model can decrease execution time (i.e., decrease runtime), reduce CPU usage, reduce memory usage, reduce bandwidth, etc.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
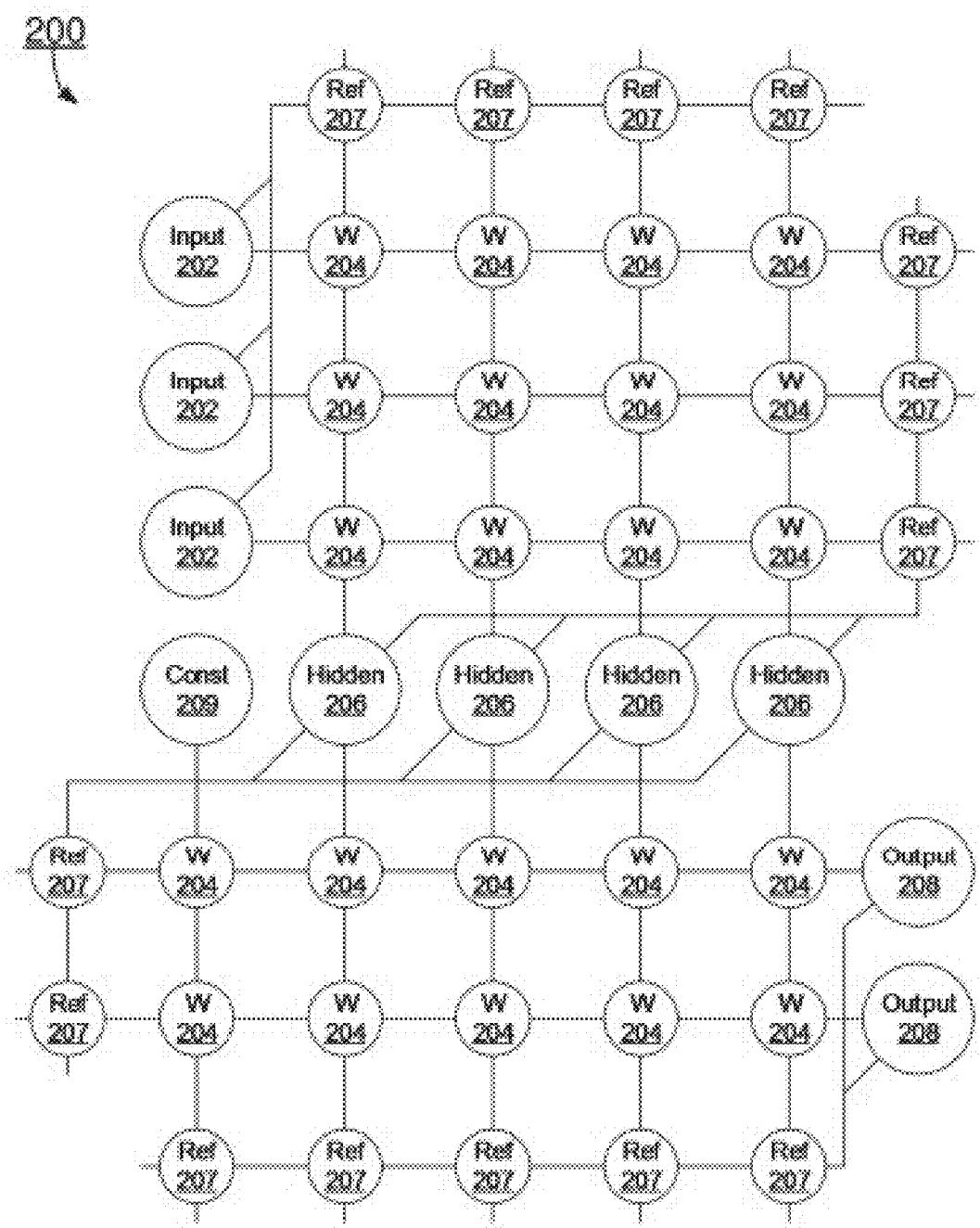
FIG. 2 depicts a block diagram an example neural network model/architecture in accordance with one or more embodiments of the present invention.

Referring now to FIG. 2, an example neural network model/architecture 200 is shown according to one or more embodiments. The neural network model/architecture 200 can be implemented using one or more software applications 111 on computer system 100. In one or more embodiments, the computer system 100 may include one or more pieces of specialized hardware such as accelerators for use with the neural network model/architecture. Operation of an example neural network model 200 is now discussed. During feed-forward operation, each of a set of input neurons 202 sends a corresponding input voltage in parallel to a respective row of weights 204. Each of the weights 204 has a settable resistance value, such that a current output flows from the weight 204 to a respective hidden neuron 206 to represent the weighted input. The current output by a given weight is determined as $I=V/r$, where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. In some embodiments, each array of weights may include one or more reference weights having a static resistance.

As an alternative to using the reference weights 207, one or more embodiments may use separate arrays of weights 204 to capture negative values. Each approach has advantages and disadvantages. In some embodiments, using the reference weights 207 is more efficient in chip area, but reference values need to be matched closely to one another. In one or more embodiments, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

In one or more embodiments, during back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 provide combine the weighted feedback signal with a derivative of its feed-forward calculation and stores an error value before outputting a feedback signal voltage to its respective column of weights 204. This back propagation travels through the entire neural network model 200 until all hidden neurons 206 and the input neurons 202 have stored an error value.

In one or more embodiments, during weight updates, the input neurons 202 and hidden neurons 206 apply a first weight update voltage forward and the output neurons 208 and hidden neurons 206 apply a second weight update voltage backward through the neural network model 200. The combinations of these voltages create a state change within each weight 204, causing the weight 204 to take on a new resistance value. In this manner the weights 204 can be trained to adapt the neural network model 200 to errors in its processing. It should be noted that the three modes of operation, feed forward, back propagation, and weight update, do not overlap with one another.

Figure 3:
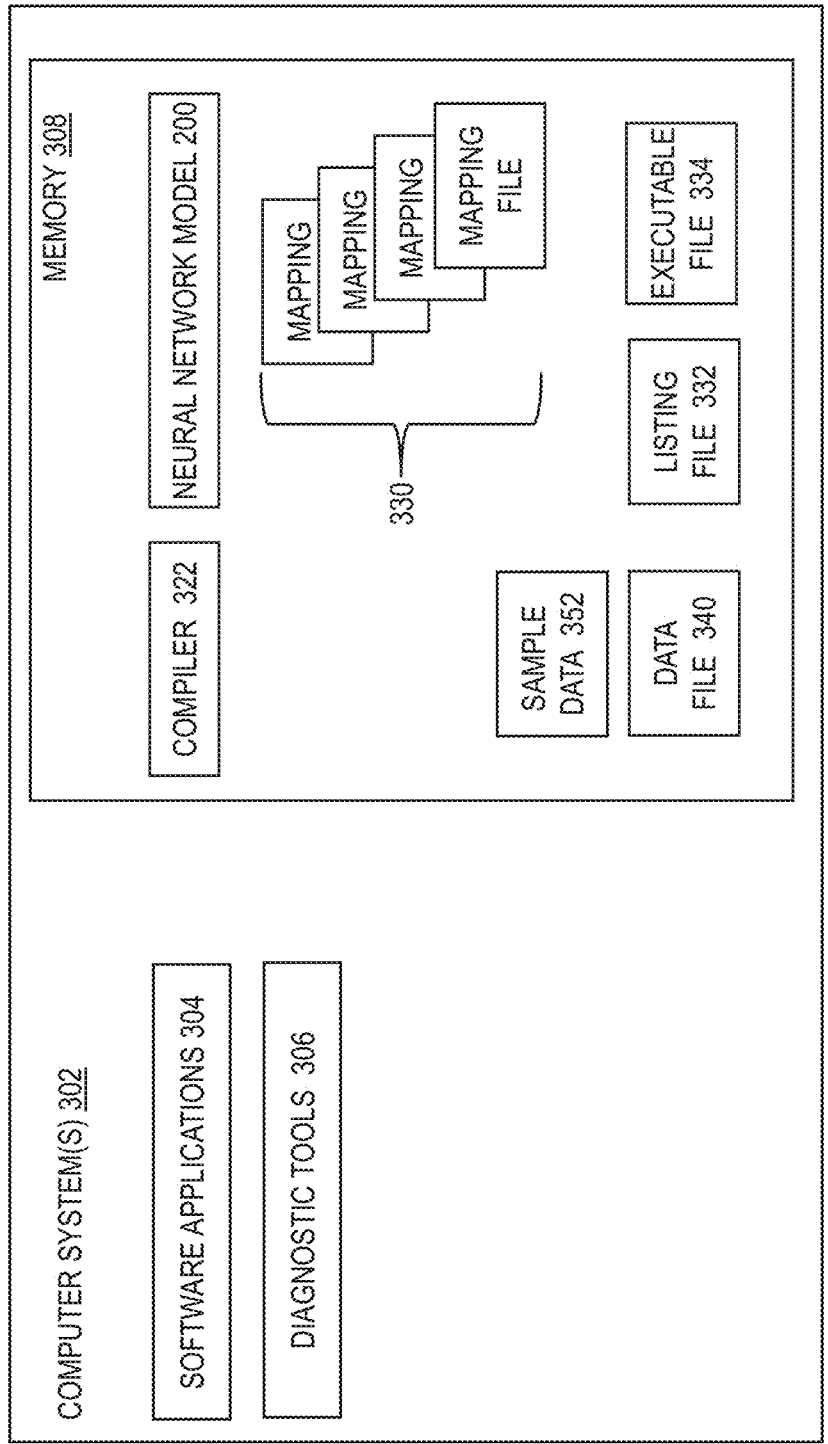
FIG. 3 depicts a block diagram of a system for locating and optimizing performance hot spots in a neural network model in accordance with one or more embodiments of the present invention.

FIG. 3 is a block diagram of a system 300 for locating and optimizing performance hot spots in a neural network model in accordance with one or more embodiments of the present invention. FIG. 3 depicts one or more computers systems 302 coupled to computer system 320, which communicate to exchange information as discussed herein. Computer system 320 can communicate with computer systems 302 over a wired and/or wireless network. Elements of computer system 100 may be used in and/or integrated into computers system 302 and computer system 320. Software applications 304 may be implemented as software 111 executed on one or more processors 101, as discussed in FIG. 1. Similarly, complier 322, diagnostic tools 306, and neural network model 200 may be implemented using software 111 configured to execute on one or more processors 101.

A compiler 322 is utilized to compile a neural network model, such as for example neural network model 200 or any other neural network model. Compiler 322 and neural network model 200 may be executed in computer system 320, computer system 302, and/or both. Compiler 322 is a multi-level intermediate (MLIR) compiler and/or uses a MLIR compiler framework. MLIR is a modern compiler infrastructure which is reusable and extensible. MLIR compiler can define dialects and optimization passes. A dialect serves as an abstraction level or intermediate representation, and an optimization pass is to enable optimization at an abstraction level or transformation among abstraction levels. There are dialects in MLIR that are ready to use, e.g., llvm, std, scf, and affine. The llvm dialect is a low-level dialect. The llvm dialect wraps the LLVM intermediate representation (IR) types and instructions into MLIR types and operations. The std dialect includes standard operations such as load, store, addi, addf, absf, and call. The scf dialect defines control flow operations such as for and if. The affine dialect provides an abstraction for affine operations and analyses. One of ordinary skill in the art understands a multi-level intermediate compiler.

Further, the compiler 322 can additionally be implemented using the Open Neural Network Exchange (ONNX) as a format to represent the input model (e.g., neural network model 200) of for compiler 322, in combination with MLIR. ONNX is an open-source machine-independent format and widely used for exchanging neural network models as understood by one or ordinary skill in the art. Compiler 322 may be written using MLIR, which is a modern open source compiler infrastructure for multi-level intermediate representations and using the LLVM Project. The LLVM Project is a compiler infrastructure which is a collection of modular and reusable compiler and tool chain technologies. Compiler 322 can be interchangeably referred to as an ONNX-MLIR compiler, MLIR compiler, and/or simply complier.

Neural network model 200 can be written and/or generated in ONNX or the ONNX format. Neural network model 200 can be an ONNX neural network model 200, which may be referred to as the ONNX model. Neural network model may also be referred to as the artificial intelligence (AI) model. Neural network model 200 can be executed which includes (first) compiling the instructions of neural network model 200 using compiler 322 into an executable format (such as, for example, executable file 334) for execution by computer system 302 and/or computer system 320 during runtime. In one or more embodiments, software applications 304 can be utilized to cause and/or initiate the compilation of neural network model 200 and (subsequent) execution of the executable/compiled neural network model 200.

Figure 4:
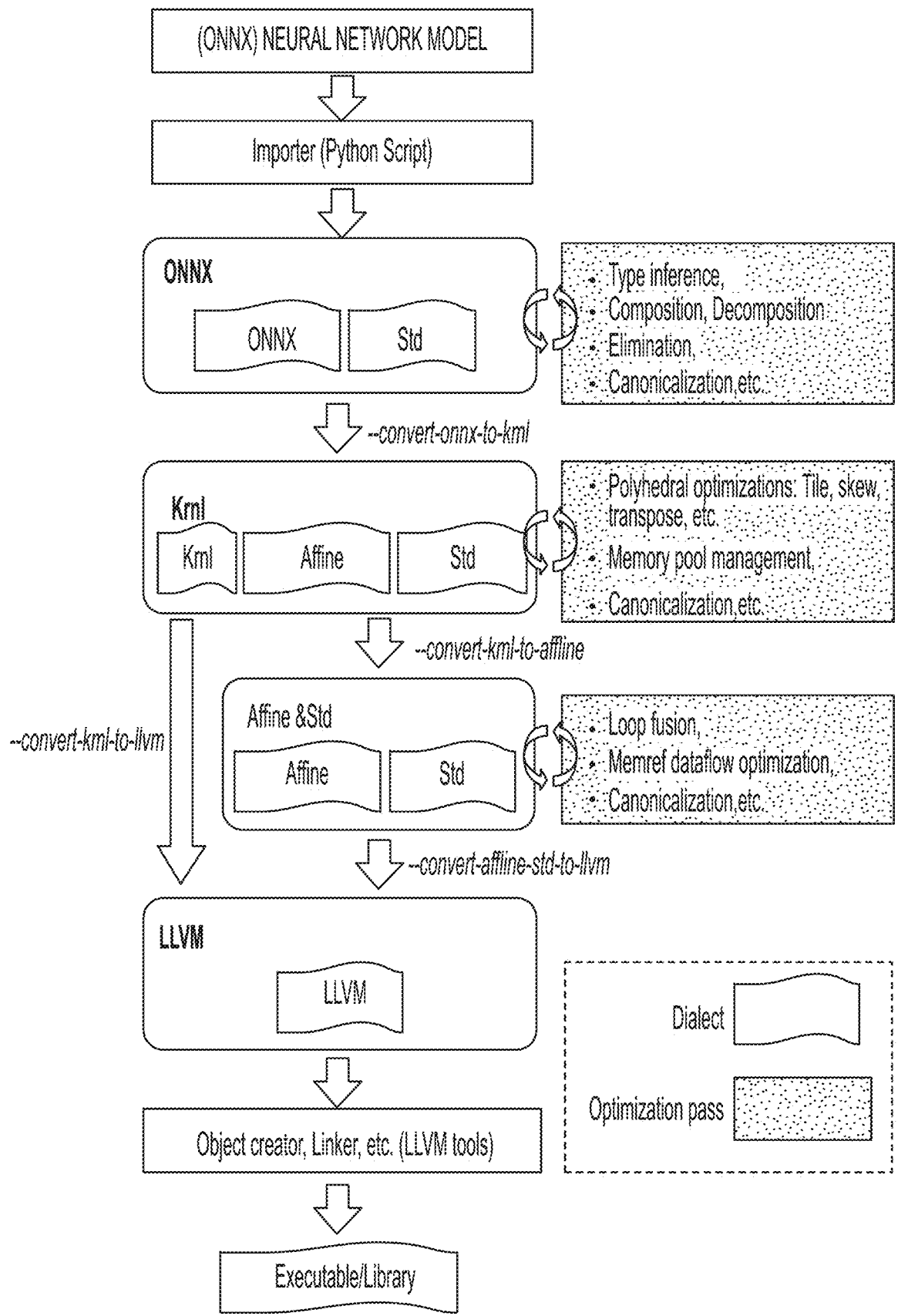
FIG. 4 depicts a block diagram of an example architecture of a compiler while compiling neural network model in accordance with one or more embodiments of the invention.

FIG. 4 is a block diagram of an example architecture of an ONNX-MLIR compiler while compiling an ONNX model (e.g., neural network model 200) in accordance with one or more embodiments of the invention. In FIG. 4, names prefixed with '—' are designated as passes. In FIG. 4, the input is an ONNX model (e.g., neural network model 200), and the output is a library containing the compiled code (e.g., executable file 334). The output library can contain an entry function called "_dyn_entry_point_main_graph" whose inputs and outputs are similar to the ONNX model's inputs and outputs, respectively. To carry out inference with the output library, users write their program to call the entry function by passing inputs to the function and obtain results. Although there can be fewer or more dialects, there are five main dialects in onnx-mlir, and these dialects are onnx, krnl, affine, std, and llvm, which are organized into four abstraction levels. The first abstraction level is a high-level representation of ONNX operations. The first abstraction level consists of operations in onnx and std dialects, where the onnx dialect is automatically generated via an importer that is, for example, a Python® script or another script. The second abstraction level includes krnl, affine, and std dialects. The krnl dialect provides a representation that is suitable for loop optimizations, which is able to carry out affine transformations such as tile, skew, and permutation easily. The krnl dialect serves as an intermediate dialect for efficiently lowering the onnx dialect into low-level dialects (e.g., affine, std, and llvm). The third abstraction level includes affine and std dialects where existing optimization passes in MLIR can be freely applied. The fourth abstraction level includes only llvm dialect that is ready to generate bitcode (i.e., binary code) (i.e., the executable file 334).

There are MLIR passes for converting one dialect to another, and for doing optimizations at a specific dialect. A multi-pass compiler is a type of compiler that processes the source code or abstract syntax tree of a program several times. This is in contrast to a one-pass compiler, which traverses the program only once. Each pass takes the result of the previous pass as the input and creates an intermediate output. In this way, the (intermediate) code is improved pass-by-pass, until the final pass produces the final code. The onnx dialect is converted to krnl dialect via pass—convert-onnx-to-krnl. Then, krnl dialect (except some of its operations) is converted into affine and std dialects via pass—convert-krnl-to-affine. The remaining operations in krnl dialect and operations in affine and std dialects are directly converted into instructions in llvm via pass—convert-krnl-to-llvm. The right side of FIG. 4 shows optimization passes in a shaded pattern that can be carried out at each abstraction level. It should be appreciated that the list of optimization passes is not exhaustive. As noted herein, MLIR provides an extensible framework for transformations on operations, using familiar concepts of compiler passes. Enabling an arbitrary set of passes on an arbitrary set of operations results in a significant scaling challenge, since each transformation must potentially take into account the semantics of any operation. However, MLIR addresses this complexity by allowing operation semantics to be described abstractly using Traits and Interfaces, enabling transformations to operate on operations more generically. Traits often describe verification constraints on valid IR, enabling complex invariants to be captured and checked.

Figure 7:
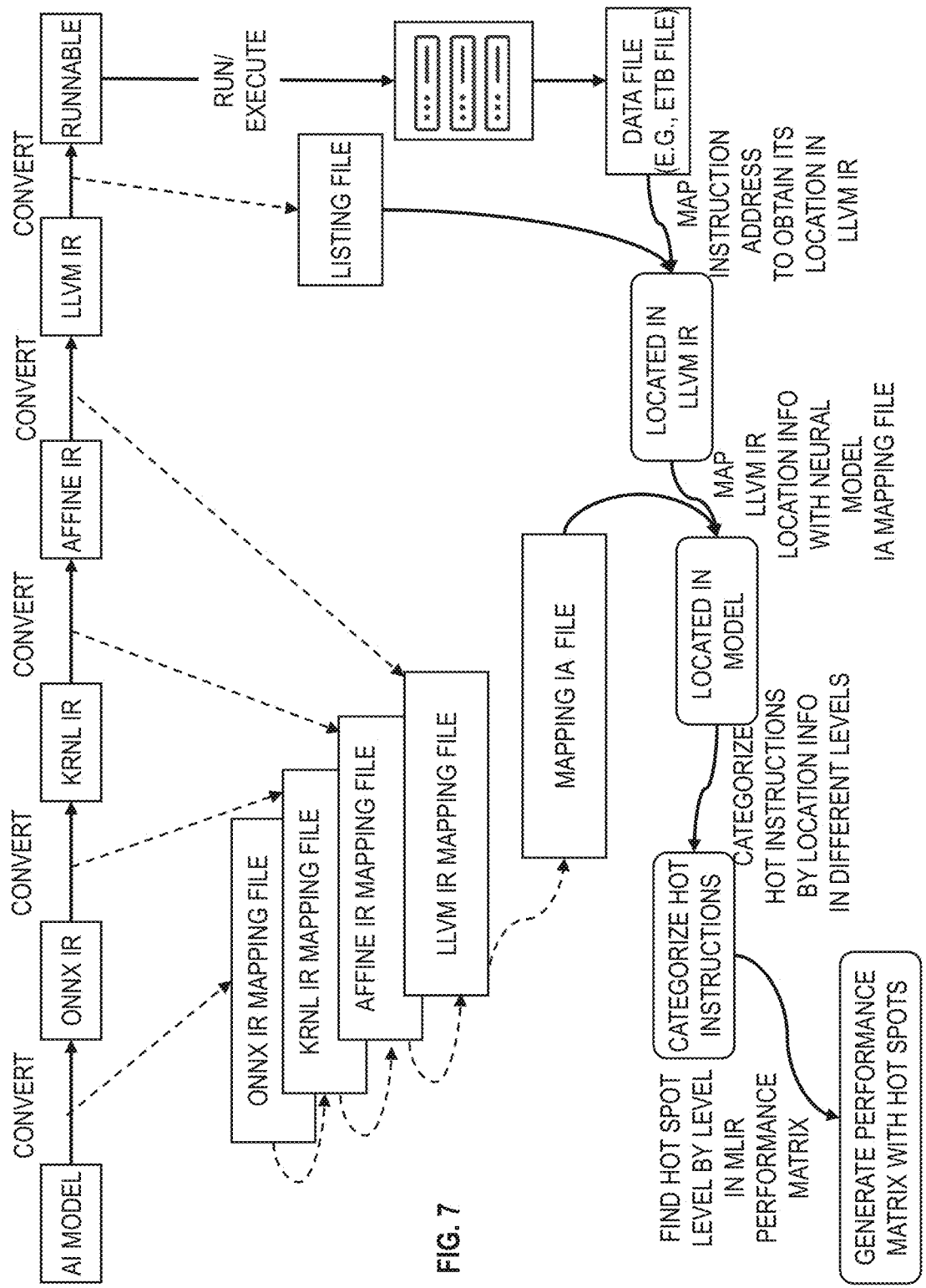
FIG. 7 depicts a block diagram of a computer-implemented control flow for locating performance hotspots in a neural network model for optimization in accordance with one or more embodiments of the invention.

Compiler 322 is configured to generate mapping files 330 at each stage of the compiling/conversion process as depicted in FIG. 7. For example, mapping files 330 in FIG. 3 include: an onnx intermediate representation (IR) mapping file used for converting the ONNX model (e.g., neural network model 200 and/or artificial intelligence mode) to the onnx IR (code); a krnl IR mapping file used for converting the onnx IR (code) to krnl IR (code); an affine IR mapping file used for converting the krnl IR (code) to affine IR (code); and an LLVM IR mapping file used for converting the affine IR (code) to llvm IR (code). Compiler 322 generates a listing file 332 used to convert the llvm IR (code) into an executable file 334, also referred to as an executable, library, binary code, assembly language, etc., that is capable of being read and run by the hardware/software of computer system 302 and/or computer system 320 as depicted in FIG. 7. Accordingly, executable file 334 is run/executed by computer system 302 (and/or computer system 320), which corresponds to running/executing neural network model 200 to perform an inference as also depicted in FIG. 7. For example, neural network model 200 may be designed to receive incoming data and classify the data as output. During runtime, computer system 302 generates a data file 340 that contains various information including instructions, instruction addresses, performance metric data, etc., which are available to assist with improvements to neural network model 200 as discussed further herein.

Figure 5:
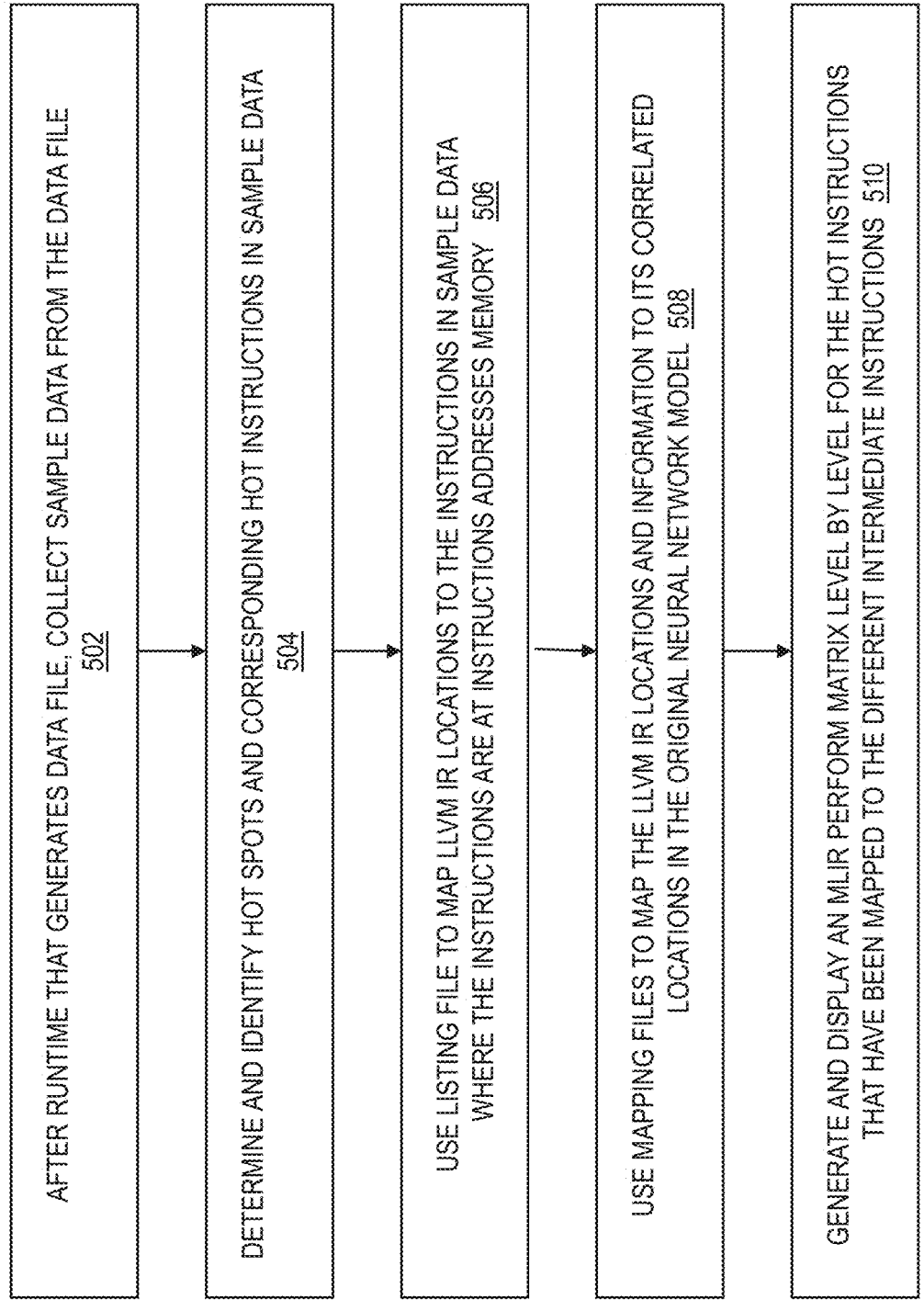
FIG. 5 is a flowchart of a computer-implemented process for locating performance hot spots in a neural network model in accordance with one or more embodiments of the invention.

FIG. 5 is flowchart of a computer-implemented process 500 for locating performance hot spots in a neural network model in accordance with one or more embodiments of the present invention. Computed implemented process 500 may be performed using computer system 302 in FIG. 2. Computer-implemented process 500 in FIG. 5 will be described with reference to FIG. 2.

At block 502, after runtime that generated data file 340, software application 304 is configured to collect sample data 352 from data file 340. Sample data 352 may be a portion of data file 340. In one or more embodiments, sample data 352 may include all of data file 304. Data file 340 is generated as a result of executing neural network model 200 that was previously compiled. Data file 340 includes instructions, instruction addresses of the instructions, performance metrics for each instruction and/or instruction address, etc. Performance metrics include cache misses, information from hardware counters, information from software counters, CPU usage, memory usage, etc. Sample data 352 includes all of the types of information included in data file 340 along with the number of sample occurrences. Different computer architectures can have different counter numbers. One architecture may have a number of counters from 10 to 1000, for example. In one or more embodiments, data file 340 can be an ETB file, as depicted in the control flow of FIG. 7.

At block 504, software application 304 is configured to determine and identify performance hot spots and corresponding hot instructions in sample data 352. To identify performance hot spots, software application 304 may include and/or call one or more diagnostic tools 306 to identify instructions that meet and/or exceed a predetermined threshold for a metric and/or a combination of metrics. A performance hot spot is an instruction, operation, and/or code that causes computer system 302 (and/or computer system 320) to meet and/or exceed predetermined threshold for a metric(s). For example, performance hot spots can refer to determining that one or more instructions, operations, and/or pieces of code meet and/or exceed one or a combination of predetermined thresholds related to CPU usage (e.g., processor usage such as a percentage), execution time (e.g., ticks, clocks, etc.), cache misses, memory usage, etc. In some cases, even if the instruction, operation, and/or code does not meet and/or exceed any predetermined threshold, a performance hot spot could exceed an average performance metric compared to other instructions in sample data 352. For example, a performance hot spot could be outside the statistical average for a performance metric and/or a combination of performance metrics. Software application 304 and/or diagnostic tools 306 may parse sample data 352 to determine performance metrics, along with the associated instructions, which meet and/or exceed one or a combination of predetermined thresholds. Performance hot spot analysis can be manual, automatic, and/or semiautomatic. In or more embodiments, experienced performance analysts and developers use analysis tools to traverse through the performance hot spots in different levels and find the most valuable pieces to optimize. Software application 304 and/or diagnostic tools 306 can employ known methods and techniques for diagnostics and performance of software as understood by one of ordinary skill in the art.

At block 506, software application 304 is configured to use listing file 332 to map LLVM IR locations to the instructions in sample data 352 where the instructions are at instruction addresses in, for example, memory 308. The instructions are runnable code like executable file 334 discussed in FIG. 4. Runnable instructions are compiled from LLVM IR as noted in FIG. 4 and illustrated in FIG. 7. Thus, there is a mapping relationship between LLVM IR and instruction addresses. The relationship is represented by a file called listing file 332. Listing file 332 is generated when compiling LLVM IR into executable file 334, and executable file 334 is the runnable code, binary code, machine code, etc., which can be stored in memory 308. The LLVM IR is the lowest-level code that is not the binary code. The listing file may include the following example columns of Table 1.

TABLE 1

| Instruction Address | Symbol Name | Src File | Line # |
|---|---|---|---|
| 0x1000 | add( ) | math.c | 13 |
| * * * | | | |

At block 508, software application 304 is configured to use mapping files 330 to map the LLVM IR locations and information to its correlated locations in the original neural network model 200. Neural network model 200 (e.g., the original AI model) takes several transforming stages to convert neural network model 200 to the final runnable code (e.g., executable file 334). Each transforming stage has a mapping file, and the combination of these mapping files can be utilized to convert the LLVM IR back to the neural network model 200 (e.g., original AI model). Each mapping file 330 contains relationships and transformations from the current intermediate representation back to the previous higher-level intermediate representation, and from the highest-level intermediate representation back to the neural network model 200 as depicted in FIG. 7. Thus, software application 304 can locate the LLVM IR locations in the original AI model by, for example, mapping the input code to the output code. For example, software application 304 is configured to use the LLVM IR mapping file of mapping files 330 to map the LLVM IR locations and information to correlated affine IR locations in the affine IR (code). Likewise, software application 304 is configured to use the affine IR mapping file of mapping files 330 to map the affine IR locations and information to correlated krnl IR locations in the krnl IR (code). Similarly, software application 304 is configured to use the krnl IR mapping file of mapping files 330 to map krnl IR locations and information to correlated onnx IR locations in the onnx IR (code). Software application 304 is configured to use the onnx IR mapping file of mapping files 330 to map the onnx IR locations and information back to the ONNX model which is neural network model 200 (i.e., AI mode). As can be seen, the instructions are traced in reverse order through the MLIR compiling stages (e.g., in the reverse order of FIG. 4 and the reverse order of the conversions in FIG. 7). The mapping relationships in each individual mapping file (such as the LLVM IR mapping file, the affine IR mapping file, the krnl IR mapping file, and the onnx IR mapping file) are used to trace each instruction address and/or operation back through the MLIR compiling stages.

Figure 6:
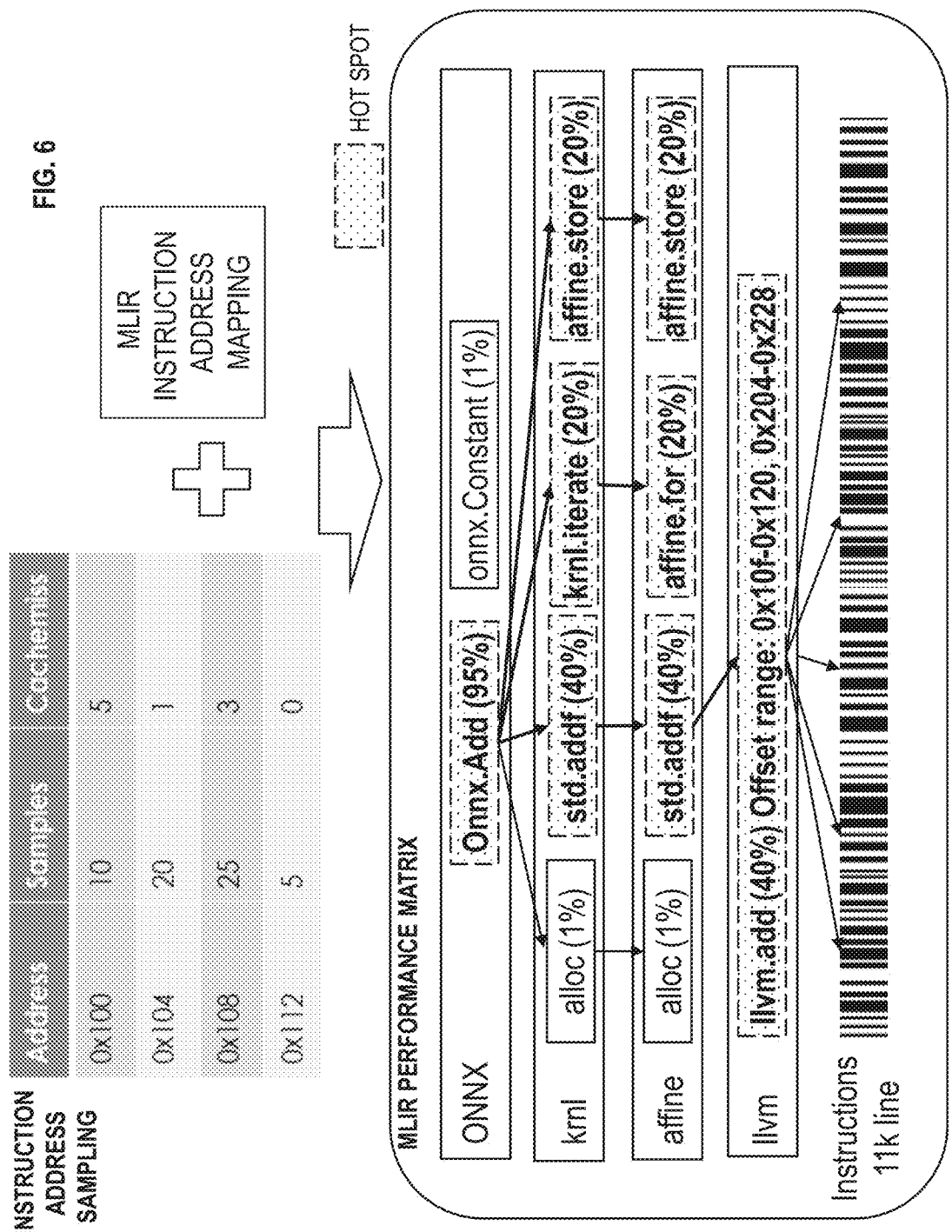
FIG. 6 depicts a block diagram of an example performance matrix displaying correlated performance hot spots at different levels of compilation in accordance with one or more embodiments of the invention.

At block 510, software application 304 is configured to generate and display an MLIR perform matrix level by level for the hot instructions that have been mapped to the different intermediate instructions. FIG. 6 is a block diagram of an example MLIR performance matrix displaying correlated performance hot spots at different levels of compilation in accordance with one or more embodiments of the invention. The MLIR performance matrix can be displayed on a display such as display 119, thereby allowing the user to quickly visualize which operations can be optimized to correct one or more hotspots. Software application 304 generates the MLIR performance matrix using the instruction addresses of sample data 352 combined with the mapping files 330 which can include instruction addresses. The performance matrix illustrates the performance hot spots which are displayed at different levels using a dotted pattern, such that the user can choose and/or software application 304 can select the best level (as well as operation) for optimization. For example, software application 304 can select to optimize at the LLVM IR, affine IR, krnl IR, and/or ONNX IR. In LLVM IR, affine IR, krnl IR, and/or ONNX IR, the selected optimizations can include dialect operations and/or passes. The LLVM IR is nearest to the instructions of sample data 352 and the performance matrix proceeds up through the ONNX IR. Neural network model 200 is not illustrated in the performance matrix, but it should be appreciated that a higher level may be displayed which includes nodes of neural network model 200; some of these nodes will be performance hot spots. In one or more embodiments, software application 304 may be configured to optimize and/or call an optimization tool (not shown) to optimize performance hot spots in any one or more levels depicted in the performance matrix FIG. 6. Software application 304 may instruct a user to perform the optimization at one or more levels. Some user may be more familiar or comfortable making modifications are a particular level. Also, some levels can be more specific to fixing the performance hot spot and/or an aspect of the performance hot spot, without potentially causing an unforeseen problem. For instance, optimizing and/or fixing a smaller operation or less complex operation at an intermediate level (while, for example, not optimizing other performance hot spots at the same level) can improve performance with causing unforeseen problems. However, optimizing a node at the neural network model could result in potential issues when the neural network model is compiled. For example, after MLIR compilation, there are thousands of hot instructions and hot basic blocks distributed in millions of instructions. If aggregating these instructions in a higher level, there may only be a few hot operations like "std.add" and "matrix bias add". As such, the user just needs to optimize these hot operations by software tuning or hardware acceleration to obtain the maximum performance improvement with minimum optimization efforts.

In FIG. 6, the values of operations at the various levels of compilation can be CPU usage, execution time, cache misses, etc., where higher values are worse. In this example, the threshold for the performance metric could be, for example, 20% such that each operation with a value of 20% or more is a performance hot spot. By displaying the values with the names of the operation in each level (e.g., LLVM IR, affine IR, krnl IR, and/or ONNX IR), the user can easily and quickly visualize where improvements and optimizations can be made. For example, based on the instruction address to name mapping relationships which were provided by mapping files 330, discrete instruction addresses ranges 0x10f-0x120, 0x204-x228 belong to "llvm.add" node in FIG. 6. Then, the samples in address 0x112, 0x120, 0x204, 0x208, etc., will be aggregated to llvm.add node. The aggregated samples number of llvm.add are 40% of the total sample number. Based on using the mapping file 330 to map nodes in affine pass with llvm nodes, llvm.add node is transformed to the std.addf node. Accordingly, all llvm.add sample numbers are aggregated to std.addf node. Std.addf node is the hottest node in affine pass, as seen in FIG. 6.

FIG. 7 is a block diagram of a computer-implemented control flow of locating performance hotspots in a neural network model for optimization in accordance with one or more embodiments of the invention. In one or more embodiments, the computer-implemented control flow may be performed by computer system 302. In one or more embodiments, part of the computer-implemented control flow may be performed by computer system 320 such as compilation and execution of neural network model 200 and part by computer system 302 such as determining and locating performance hot spots. In the compilation process, it generates the Mapping IA file (e.g., as mapping files 330) and listing file (e.g., listing file 332). In the execution process, the computer system 302 uses a sampling tool that collects data file, etc., (e.g., data file 340). After performed by computer system 302, the computer system 302 uses mapping IA file, listing file and data file to locate performance hot spots.

Figure 8:
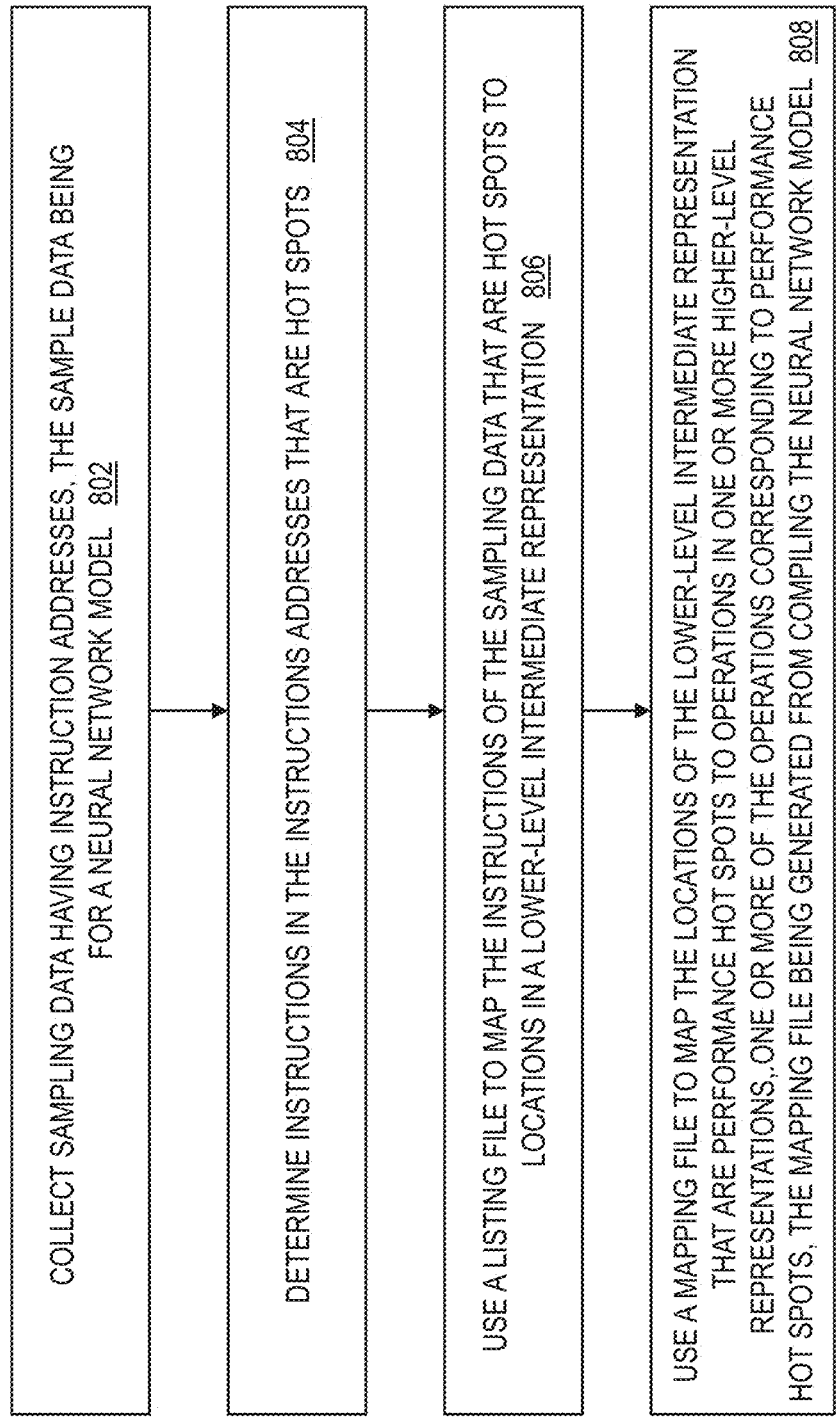
FIG. 8 is a flowchart of a computer-implemented method for locating performance hot spots in a neural network model and optimizing one or more performance hot spots in accordance with one or more embodiments of the present invention.

FIG. 8 is a flowchart of a computer-implemented process 800 for locating performance hot spots in a neural network model and optimizing one or more performance hot spots in accordance with one or more embodiments of the present invention. Computer-implemented process 800 in FIG. 8 can be performed by system 300 in FIG. 3 and will be described with reference to FIG. 3.

At block 802, software application 304 on computer system 302 is configured to collect sample data (e.g., sample data 352) having instruction addresses (IA), the sample data being for a neural network model 200. The sample data 352 can be from data file 340 that was generated during execution of neural network model 200, particularly, execution of the compiled neural network model 200.

At block 804, software application 304 on computer system 302 is configured to determine instructions in the instruction addresses that are performance hot spots. For example, software application 304 may include the functionality of and/or call/instruct one or more known diagnostic tools 306 that are configured to determine performance hot spots based on performance metrics.

At block 806, software application 304 on computer system 302 is configured to use a listing file 332 to map the instructions of the sample data 352 that are performance hot spots to locations in a lower-level intermediate representation. The lower-level intermediate representation can be LLVM IR (code).

At block 808, software application 304 on computer system 302 is configured to use a mapping file (e.g., mapping files 330) to map the locations of the lower-level intermediate representation that are performance hot spots to operations in one or more higher-level (intermediated) representations (e.g., in affine IR, in krnl IR, in ONNX IR, etc.), one or more of the operations corresponding to the performance hot spots, the mapping file 330 being generated from compiling the neural network model 200.

Software application 304 on computer system 302 is configured to use the mapping file 330 to map the operations in the one or more higher-level representations to nodes in the neural network model 200. Software application 304 on computer system 302 is configured to determine which nodes in the neural network model 200 represent the performance hot spots based on mapping from the one or more higher-level (intermediate) representations which were mapped from the lower-level intermediate representation which was mapped from the sample data 352.

Software application 304 on computer system 302 is configured to use the mapping file 330 to categorize the performance hot spots in different levels of compiling the neural network model 200, the different levels comprising the lower-level intermediate representation though the one or more higher-level representations. The different levels can include LLVM IR, affine IR, krnl IR, and/or ONNX IR. The sample data (e.g., sample data 352) further includes information from one or more counters. Information regarding the execution of neural network model 200 from hardware and/or software counters can be stored in data file 340 for which sample data has been collected. The performance hot spots include one or more (performance) metrics that meet and/or exceed one or more thresholds (e.g., performance metric thresholds). Software application 304 on computer system 302 is configured to determine one or more operations in the one or more higher-level representations to optimize to address the performance hot spots.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
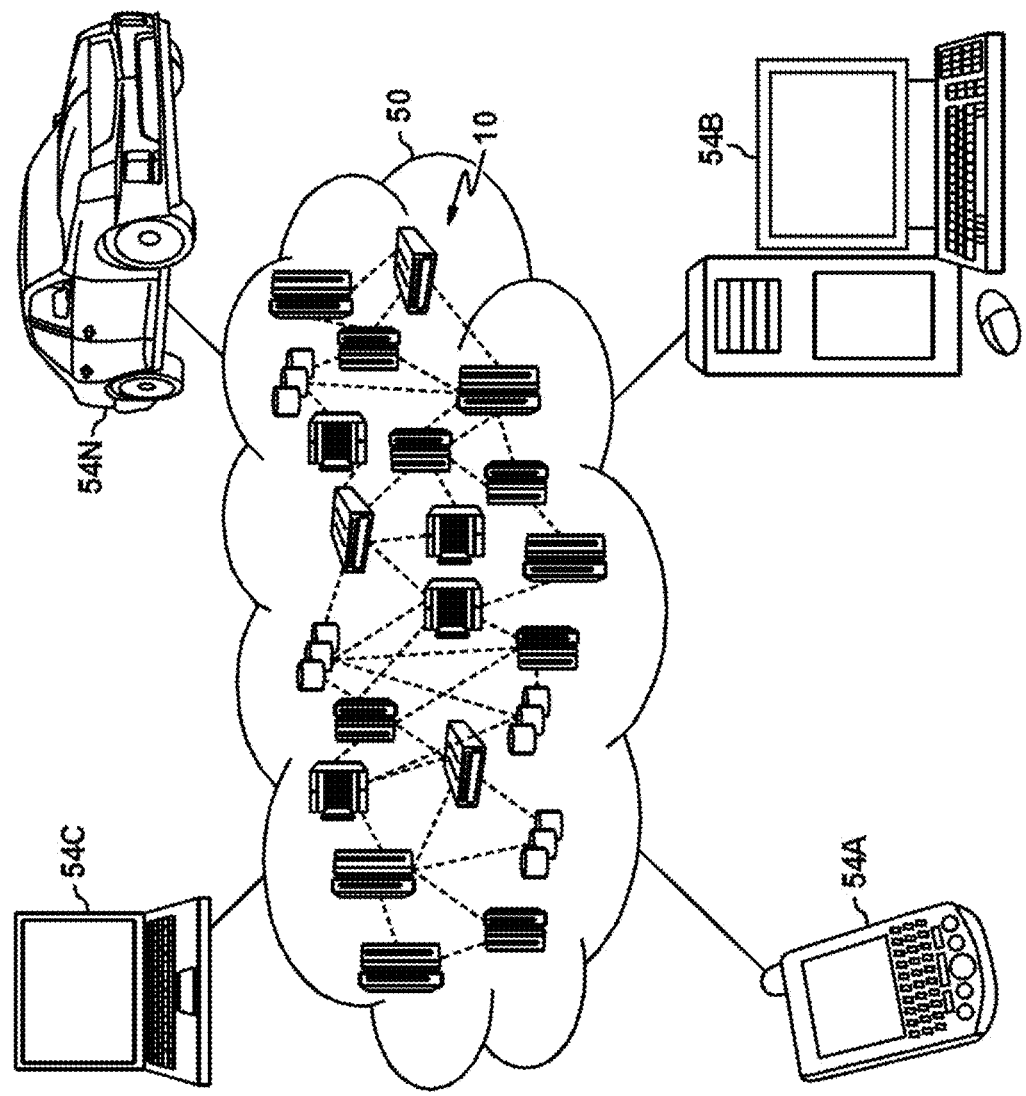
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
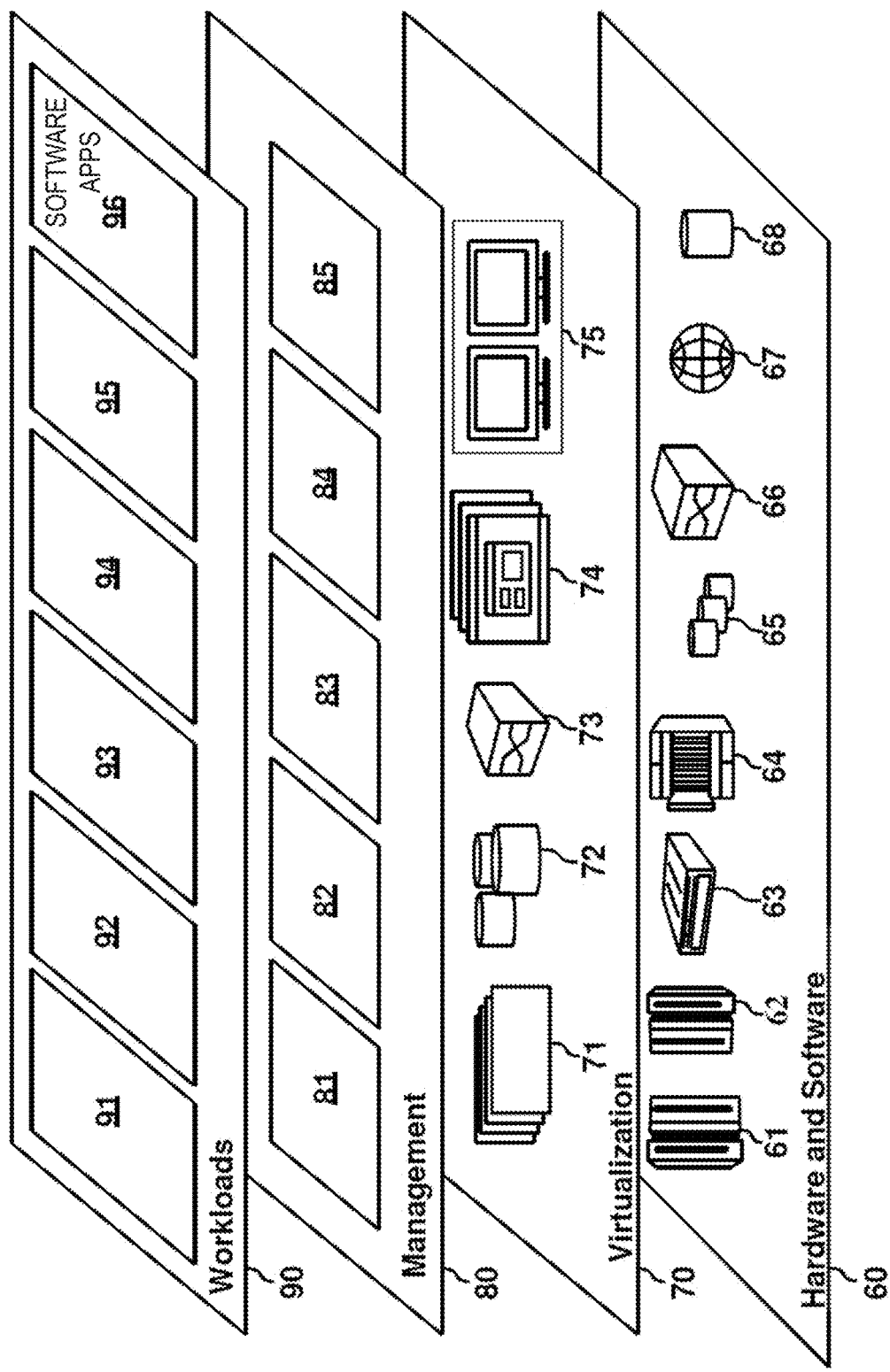
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 304, compiler 322, neural network model 200, etc.) implemented in workloads and functions 96. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    collecting sample data having instruction addresses, the sample data being for a neural network model;
    determining instructions in the instruction addresses that are performance hot spots;
    using a listing file to map the instructions of the sample data that are performance hot spots to locations in a lower-level intermediate representation; and
    using a mapping file to map the locations of the lower-level intermediate representation that are performance hot spots to operations in one or more higher-level representations, one or more of the operations corresponding to the performance hot spots, the mapping file being generated from compiling the neural network model, the mapping file comprising the lower-level intermediate representation of the neural network model and the one or more higher-level representations of the neural network model, wherein an identification of the performance hot spots is viewable in the lower-level intermediate representation through the one or more higher-level representations of the neural network model.

2. The computer-implemented method of claim 1, further comprising using the mapping file to map the operations in the one or more higher-level representations to nodes in the neural network model.

3. The computer-implemented method of claim 1, further comprising determining which nodes in the neural network model represent the performance hot spots based on mapping from the one or more higher-level representations which were mapped from the lower-level intermediate representation which was mapped from the sample data.

4. The computer-implemented method of claim 1, further comprising using the mapping file to categorize the performance hot spots in different levels of compiling the neural network model, the different levels comprising the lower-level intermediate representation through the one or more higher-level representations.

5. The computer-implemented method of claim 1, wherein the sample data further comprises information from one or more counters.

6. The computer-implemented method of claim 1, wherein the performance hot spots comprise one or more metrics that meet or exceed one or more thresholds.

7. The computer-implemented method of claim 1, further comprising determining one or more of the operations in the one or more higher-level representations to optimize to thereby address the performance hot spots.

8. A system comprising:
a memory having computer readable instructions; and
one or more processors for executing the computer readable instructions, the computer readable instructions controlling the one or more processors to perform processes comprising:
collecting sample data having instruction addresses, the sample data being for a neural network model;
determining instructions in the instruction addresses that are performance hot spots;
using a listing file to map the instructions of the sample data that are performance hot spots to locations in a lower-level intermediate representation; and
using a mapping file to map the locations of the lower-level intermediate representation to operations in one or more higher-level representations, the mapping file being generated from compiling the neural network model, the mapping file comprising the lower-level intermediate representation of the neural network model and the one or more higher-level representations of the neural network model, wherein an identification of the performance hot spots is viewable in the lower-level intermediate representation through the one or more higher-level representations of the neural network model.

9. The system of claim 8, further comprising using the mapping file to map the operations in the one or more higher-level representations to nodes in the neural network model.

10. The system of claim 8, further comprising determining which nodes in the neural network model represent the performance hot spots based on mapping from the one or more higher-level representations which were mapped from the lower-level intermediate representation which was mapped from the sample data.

11. The system of claim 8, further comprising using the mapping file to categorize the performance hot spots in different levels of compiling the neural network model, the different levels comprising the lower-level intermediate representation through the one or more higher-level representations.

12. The system of claim 8, wherein the sample data further comprises information from one or more counters.

13. The system of claim 8, wherein the performance hot spots comprise one or more metrics that meet or exceed one or more thresholds.

14. The system of claim 8, further comprising determining one or more of the operations in the one or more higher-level representations to optimize to thereby address the performance hot spots.

15. A computer program product comprising a computer readable storage medium having program instructions embodied therewith, the program instructions executable by one or more processors to cause the one or more processors to perform processes comprising:
collecting sample data having instruction addresses, the sample data being for a neural network model;
determining instructions in the instruction addresses that are performance hot spots;
using a listing file to map the instructions of the sample data that are performance hot spots to locations in a lower-level intermediate representation; and
using a mapping file to map the locations of the lower-level intermediate representation to operations in one or more higher-level representations, the mapping file being generated from compiling the neural network model, the mapping file comprising the lower-level intermediate representation of the neural network model and the one or more higher-level representations of the neural network model, wherein an identification of the performance hot spots is viewable in the lower-level intermediate representation through the one or more higher-level representations of the neural network model.

16. The computer program product of claim 15, further comprising using the mapping file to map the operations in the one or more higher-level representations to nodes in the neural network model.

17. The computer program product of claim 15, further comprising determining which nodes in the neural network model represent the performance hot spots based on mapping from the one or more higher-level representations which were mapped from the lower-level intermediate representation which was mapped from the sample data.

18. The computer program product of claim 15, further comprising using the mapping file to categorize the performance hot spots in different levels of compiling the neural network model, the different levels comprising the lower-level intermediate representation through the one or more higher-level representations.

19. The computer program product of claim 15, wherein the sample data further comprises information from one or more counters.

20. The computer program product of claim 15, wherein the performance hot spots comprise one or more metrics that meet or exceed one or more thresholds.

* * * * *